No. 618,975. Patented Feb. 7, 1899.
W. F. ALTENBAUGH.
MACHINE FOR AUTOMATICALLY GATHERING AND DELIVERING GLASS IN MANUFACTURING GLASSWARE.
(Application filed June 28, 1898.)
(No Model.) 5 Sheets—Sheet 1.
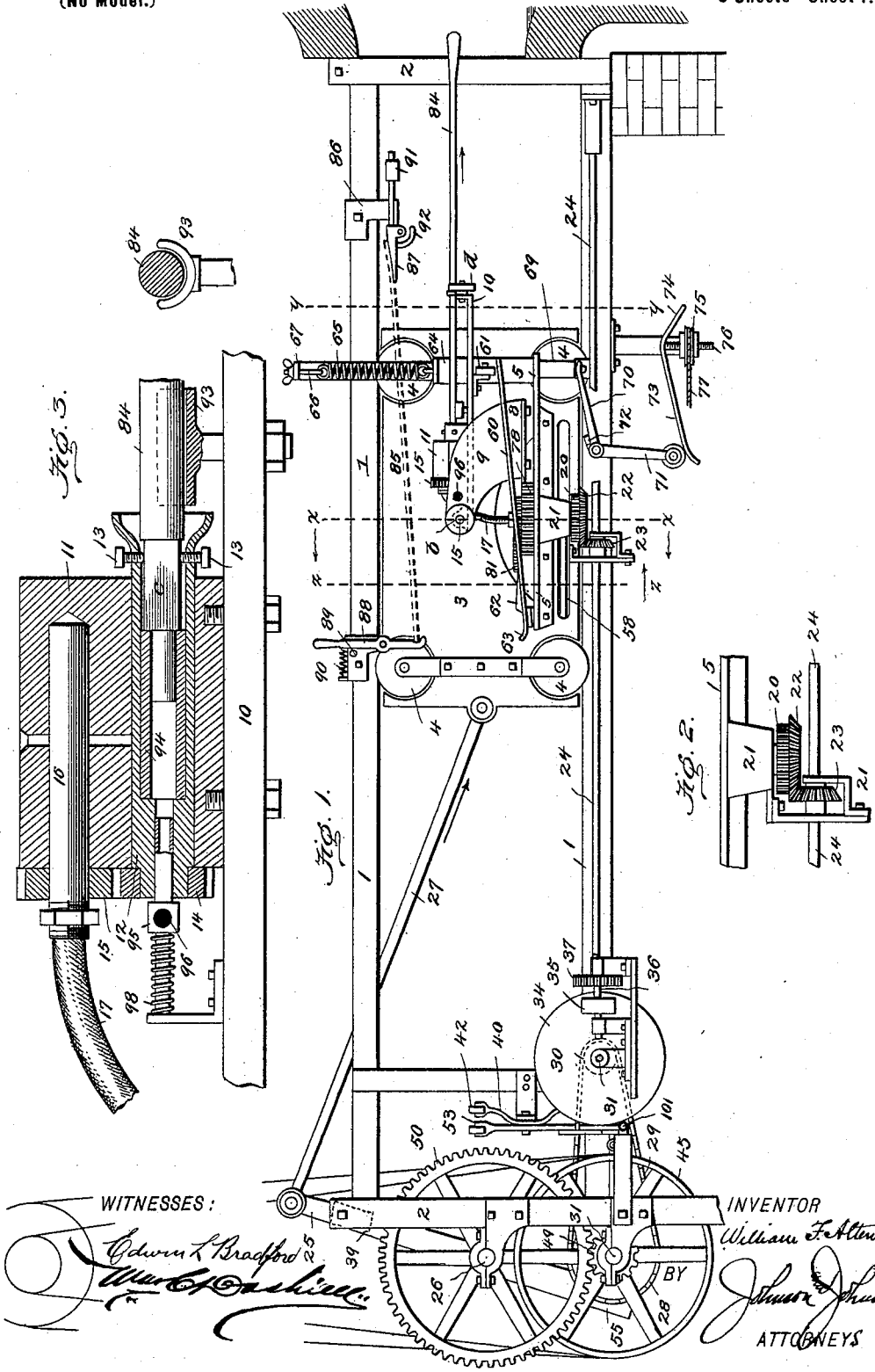
WITNESSES:
INVENTOR
William F. Altenbaugh
BY
Johnson & Johnson
ATTORNEYS
THE NORRIS PETERS CO., PHOTO-LITHO., WASHINGTON, D. C.

No. 618,975. Patented Feb. 7, 1899.
W. F. ALTENBAUGH.
MACHINE FOR AUTOMATICALLY GATHERING AND DELIVERING GLASS IN MANUFACTURING GLASSWARE.
(Application filed June 28, 1898.)
(No Model.) 5 Sheets—Sheet 2.
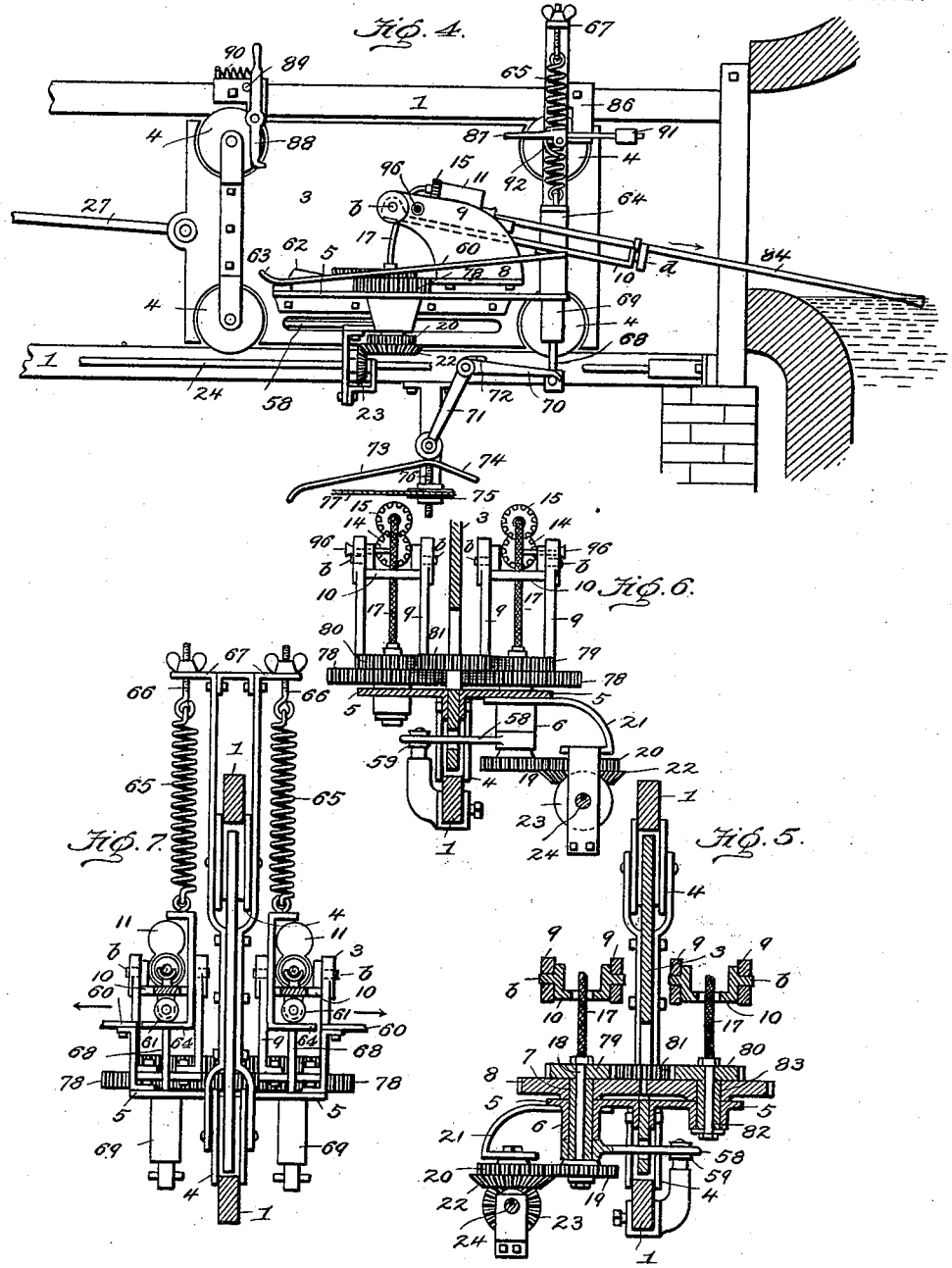
WITNESSES:
Edwin L. Bradford
INVENTOR
William F. Altenbaugh
BY
Johnson and Johnson
ATTORNEYS
THE NORRIS PETERS CO., PHOTO-LITHO., WASHINGTON, D. C.

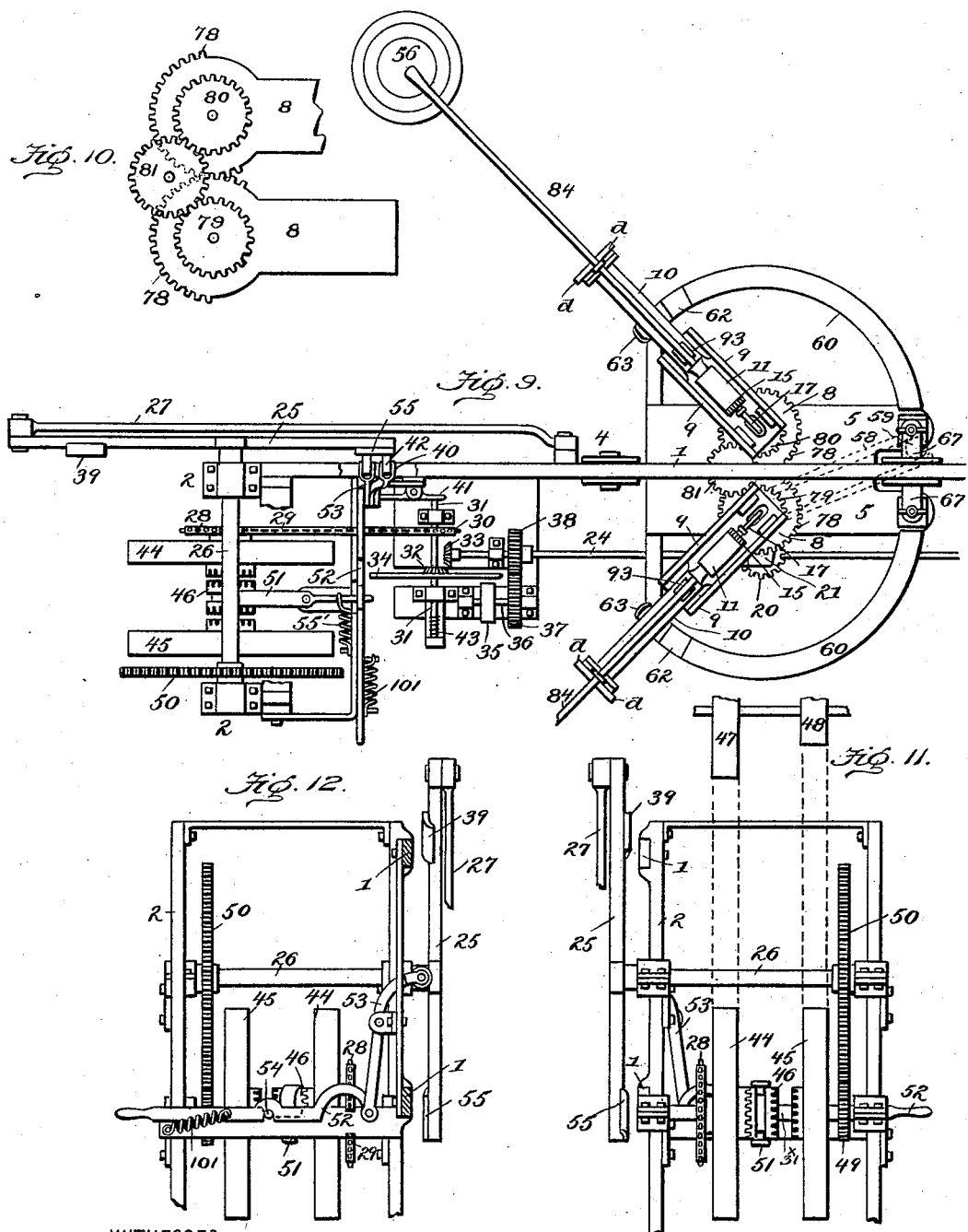

No. 618,975. Patented Feb. 7, 1899.
W. F. ALTENBAUGH.
MACHINE FOR AUTOMATICALLY GATHERING AND DELIVERING GLASS IN MANUFACTURING GLASSWARE.
(Application filed June 28, 1898.)
(No Model.) 5 Sheets—Sheet 4.
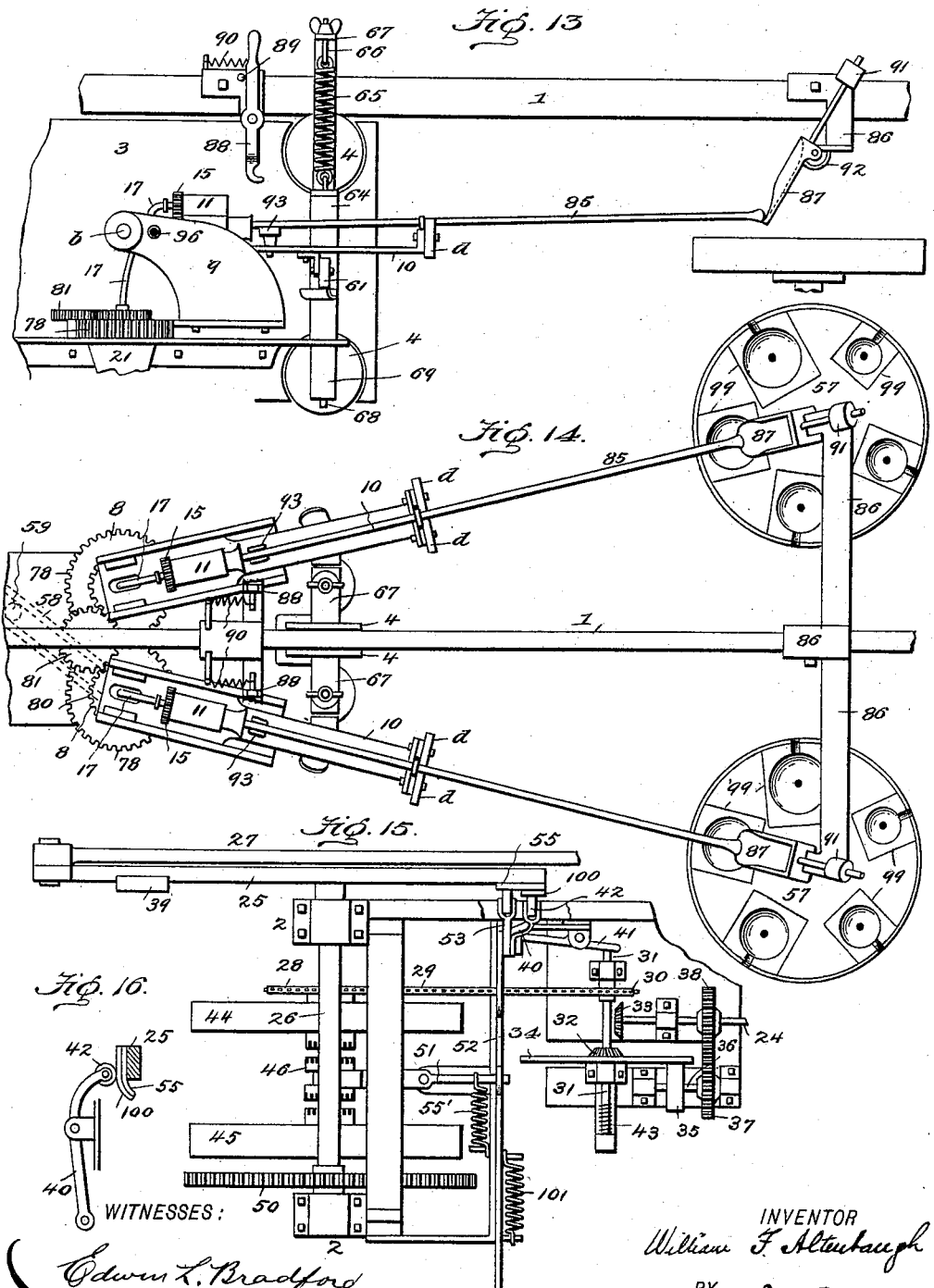
WITNESSES:
Edwin L. Bradford
INVENTOR
William F. Altenbaugh
BY
Johnson & Johnson
ATTORNEYS No. 618,975. Patented Feb. 7, 1899.
W. F. ALTENBAUGH.
MACHINE FOR AUTOMATICALLY GATHERING AND DELIVERING GLASS IN MANUFACTURING GLASSWARE.
(Application filed June 28, 1898.)
(No Model.) 5 Sheets—Sheet 5.
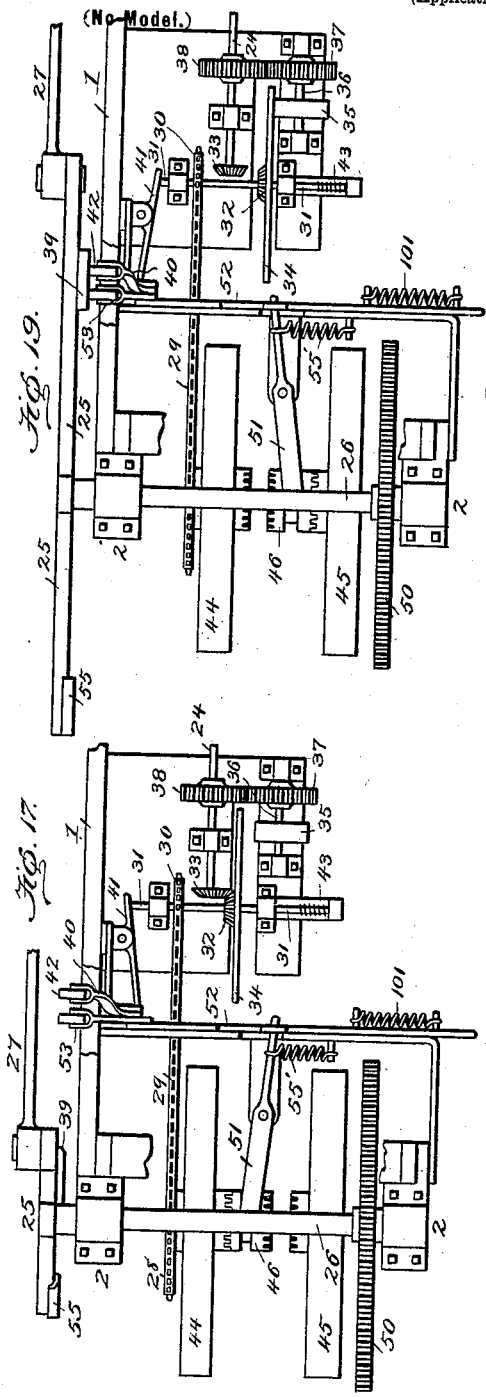
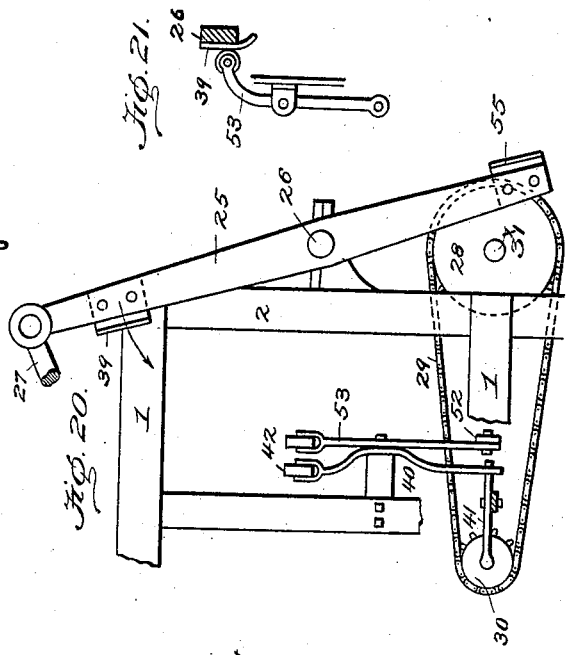
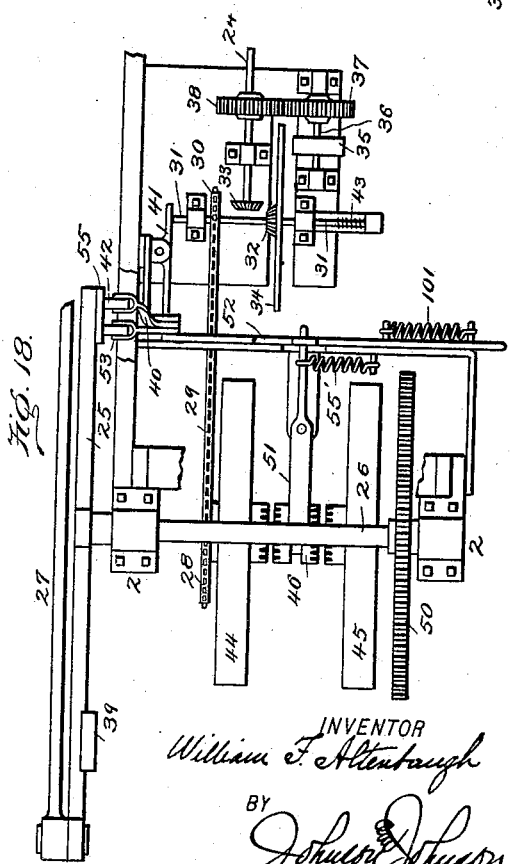
WITNESSES:
Edwin L. Bradford
INVENTOR
William F. Altenbaugh
BY
Johnson & Johnson
ATTORNEYS

UNITED STATES PATENT OFFICE.

WILLIAM FRANCIS ALTENBAUGH, OF TIFFIN, OHIO, ASSIGNOR OF ONE-HALF TO GEORGE BEATTY, OF DUNKIRK, INDIANA.

MACHINE FOR AUTOMATICALLY GATHERING AND DELIVERING GLASS IN MANUFACTURING GLASSWARE.

SPECIFICATION forming part of Letters Patent No. 618,975, dated February 7, 1899.

Application filed June 28, 1898. Serial No. 684,685. (No model.)

*To all whom it may concern:*

Be it known that I, WILLIAM FRANCIS ALTENBAUGH, a citizen of the United States, residing at Tiffin, in the county of Seneca and State of Ohio, have invented certain new and useful Improvements in Machines for Automatically Gathering and Delivering Glass in the Manufacture of Glassware, of which the following is a specification.

My present invention is directed to the production of an improved machine for automatically gathering and delivering glass for the forming work in the manufacture of glassware, and for providing for the highest capacity in the work the machine is organized for carrying out my invention in separate operations with a solid gathering-iron and with a blowpipe.

The principle upon which the machine operates is that of automatically advancing a pivotally-mounted gathering instrument into the working chamber with a dipping action upon the surface of the molten glass, which it gathers at its skimming-point by being rotated, picking up the glass by layers in a sufficient quantity for the intended work, then reversing the direction of the longitudinal movement of the gathering instrument, raising it from the surface, swinging it out at the side of the machine, and delivering the gather for forming operations while the carriage is at rest, and then reversing the movement to again advance the gathering instrument to repeat the operation. For effecting these operations the present machine embodies novel features in its organization.

In the manufacture of pressed ware the glass is delivered from the gathering-iron into a press-mold, and in the manufacture of blown ware the gathering-blowpipe is presented to a forming-block, where the operation is continued by blowing or "puffing" into the pipe as it is rotated in the machine.

The invention which forms the subject of this patent is directed to and embodied in the machine in its capacity for use with the blowpipe in forming the article from the glass delivered therefrom; and the said invention for this purpose consists of certain novel parts and combinations of parts, which are particularly and separately pointed out in the claims concluding this specification.

For the purpose of informing those skilled in the art to which my invention appertains of the nature of my invention and for the purpose of instructing them how the same may be particularly and advantageously employed I will now describe the machine whereby it is adapted for use in gathering and delivering glass either to a molding-press or to a forming-block in the form in which I prefer to employ it; but it will be understood that my invention is not limited to the precise form herein illustrated and described, as various modifications may be made without exceeding the scope of the concluding claims.

For carrying out the invention herein claimed the machine will be described to produce what is known as "blown ware," in which a blowpipe is employed to gather the glass and deliver it to a forming-block.

The accompanying drawings illustrate a complete machine designed to secure the highest capacity for work in one organized structure in the separate operations which I have stated, and it will be found a convenient and efficient embodiment of the invention herein claimed in the operation of the machine for the manufacture of blown ware.

In the drawings, Figure 1 represents in longitudinal elevation the complete machine as organized for use with a pivotally-mounted gathering instrument, the position of which is as advancing into the working chamber. Fig. 2 shows in detail a side view of the gear connection of the carriage with the sliding gear of the line-shaft by which the gathering instrument is rotated. Fig. 3 shows in vertical longitudinal section the chuck device for carrying the gathering instrument and the gear for rotating the chuck. Fig. 4 shows in elevation so much of the machine as illustrates the gathering instrument as advancing in a dipped position skimming the surface of the glass in gathering a charge. Fig. 5 shows a transverse section of the machine on the line *x x* of Fig. 1, showing the gearing for rotating the gathering instrument from the line-shaft. Fig. 6 is a like section on the line *z z*, showing the flexible shafts 17 connecting the chuck-gearing; and Fig. 7 is a like section on the line y y of Fig. 1, showing the shelf 64 for sustaining the pivotally-mounted gathering instrument. Fig. 8 shows in top view the gear by which the gathering instrument is rotated from the line-shaft. Fig. 9 shows in top view the machine as used with duplex gathering-irons in the positions they occupy when delivering the gather into the press-molds and the clutch is out of gear. Fig. 10 shows the gear for swinging the duplex gathering instruments out at the side of the machine for delivering the gather. Fig. 11 shows the rear end of the machine, the clutch device, the connections with the power-driven shaft, and the crank cam-lever 25 for reciprocating the carriage and for actuating the clutch device for controlling the rotation of the gathering-iron. Fig. 12 is a cross-section taken at the gear end of the machine in front of the latch-bar 52 and showing its connected lever 53 and the relation thereto of the cam crank-lever for operating the latch-bar to shift the clutch. Fig. 13 shows in side view the device for suspending and automatically placing the blowpipe in its carrying-chuck, and Fig. 14 is a top view of the same as used in the duplex machine. Fig. 15 shows in top view the clutch and shifting gear connections and the relation thereto of the cam crank-lever and the supplemental cam 100 thereon for engaging the friction-gear 34 35 to accelerate the rotation of the blowpipe at the forming-block, as in Fig. 14; and Fig. 16 shows in detail the end cam 55 and the supplemental cam 100 of the crank-lever in their adaptation for actuating both the levers 40 and 53 for shifting the clutch and the friction-gear, as in Fig. 15. Fig. 17 shows in top view the clutch device and connecting mechanism for rotating the gathering instrument, the line-shaft 24 being engaged by the bevel-gear 32 33 for comparative slow rotation. Fig. 18 is a like view showing the line-shaft as being out of engagement with its actuating-gear to stop the rotation of the gathering instrument when delivering the charge. Fig. 19 shows a like view, the line-shaft being engaged by the friction-gear 34 35 for comparative rapid rotation of the gathering instrument. Fig. 20 shows in side view the cam crank-lever in its relation to the lever 53, connecting and actuating the clutch for controlling the movements of the carriage, and also the relation of the lever 40, connecting and actuating the gear-shifting devices for controlling the rotation of the gathering instrument; and Fig. 21 shows the way in which the cam crank-lever actuates the clutch-lever connections to shift the clutch and the gear-shifter.

For supporting the operating parts of the machine the frame has iron beams 1 1 of the proper length in vertical alinement one above the other, carried by end frame 2 2, and upon and between these beams a carriage 3 is mounted for reciprocating movement. A simple form for the carriage is an iron body of rectangular form standing vertically and provided with flanged rolls 4 4 at each of its corners, mounted to engage and travel with firm movements upon the beams. At its side the carriage carries the mechanism for gathering and delivering the glass. The frame has a fixed relation to the working chamber and extends therefrom, with the gathering instrument mounted and carried in such manner as to be caused to travel into and from the chamber and in such relation to the surface of the glass as to effect the gathering by a rotating skimming action.

As shown, the working capacity of the machine involves two separate gathering instruments, and as the mounting and operating mechanism of each is of identical construction a description of such mechanism and the operation of one of the gathering instruments will be identical with the other.

Near the lower side of the carriage an iron bracket 5 is bolted, standing out horizontal and has a tubular bearing 6, within which is mounted a tubular shaft 7, Fig. 3, having fixed on its upper end a sort of turn-table plate 8, having vertical cheek parts 9, to and between which is mounted by trunnions, Fig. 5, an arm 10, free to swing on its trunnions and carrying a chuck for the gathering instrument. The trunnions of this carrying-arm are mounted about vertically in line with the axis of the turn-table, and said arm 10 has fixed thereto a suitable box-casting 11, within which the chuck for the gathering instrument is secured, as in Fig. 3. Preferably this box is located in front of the trunnions of the carrying-arm, and the provision for mounting the gathering instrument consists of a tubular shaft 12, Fig. 3, arranged to rotate in the said box and having a flaring open end projecting to receive the gathering instrument, which is secured therein by screws 13 engaging the angular end c of said instrument to prevent it from turning within the chuck, while at its swing end the carrying-arm 10 has a pair of rolls d, on which the gathering instrument has a firm resting bearing and is held from working out of the chuck by a collar fitting against said rolls. The other end of the chuck-shaft has a gear 14 outside of the box, which engages a like gear 15 on a plug-pin 16, fitted to turn in a bearing in the box above the chuck-shaft. Connecting the geared end of this plug is a flexible shaft 17, which extends down through an opening in the arm 10 and connects with the upper end of a shaft 18, Fig. 5, loosely mounted within the tubular shaft 7, whereby the rotation of said shaft 18 drives the truck-shaft and rotates the gathering instrument. The provision for rotating the vertical shaft 18 is seen in Figs. 2, 5, 6, and 8, and consists of a gear 19, fixed on its lower end and engaging with an equal gear 20 on a stud fixed in a bracket 21, secured to the base-plate 5 and carrying said gear 20 outside of the gear 19. This arrangement of the gear renders it convenient to drive the flexible shaft by a sliding-gear connection with a rotating line-shaft fixed in the frame. Such sliding-gear connection is made by a bevel-gear 22 on the stud of the gear 20, and therefore carried by the carriage, so that said bevel-gear 22 will engage a bevel-pinion 23, Figs. 5 and 8, splined on the line-shaft 24, which being rotated from the clutch connections thereby rotates the gathering instrument through its flexible-shaft connections. As the carriage reciprocates the splined pinion 23 is caused by its bracket connection, Fig. 2, to slide upon the line-shaft, and, being rotated by it, rotates the vertical shaft 18 by the intermediate gear, as stated.

The rotation of the gathering instrument by means of gear in which a flexible shaft serves as an element to directly connect the said instrument with a rotating line-shaft gives a compact and effective arrangement with a reciprocating carriage and with a gathering instrument having a lateral swinging movement. The mounting of the gear mechanism upon the carriage in a way to allow it to be actuated by a sliding connection with the line-shaft allows the rotation of the gathering instrument and of its laterally-swinging movements during the reciprocation of the carriage. The mounting of the turn-table in concentric relation to the flexible-shaft connections, as in Figs. 1 and 6, renders the rotation of the gathering instrument and its lateral swing through a center common to both motions, and thereby making the line-shaft the means for controlling and changing the speed of the rotation of the gathering instrument.

The carriage is reciprocated by a crank movement, which gives the advantage of an easy stop, rendering it free from bump or jar and effecting a better delivery action of the gathering instrument. This movement is by the crank 25 on the shaft 26, mounted on the rear end frame, the said crank connecting by a rod 27 the carriage, and determines the extent, the stopping, and the reversing of its movement. This crank also serves as a lever having the function of a cam, whereby the rotation of the gathering instrument and the movements of the carriage are controlled. For this purpose the crank-lever extends on each side of its carrying-shaft and has a cam on each arm part.

The line-shaft 24 is mounted at the side of and parallel with the lower beam and rotated by a sprocket-wheel 28 on the clutch-driven shaft by a chain 29, engaging a sprocket 30, Figs. 9, 15, 16, 17, 18, 19, and 20, on shifting shaft 31, mounted in the end frame. On this shifting shaft is fixed a gear 32, which engages a gear 33 on the line-shaft, whereby it is rotated to cause the rotation of the gathering instrument. This shifting shaft 31 also has a friction-wheel 34, and the shaft itself is adapted to have only sufficient endwise movement whereby to engage said friction-wheel with accelerating gear to give a more rapid speed to the shaft 24, and through it to the gathering instrument, as I will now state. Referring to Figs. 9 and 17, the shifting shaft 31 is seen as being driven from the clutch-shaft and is engaged with the line-shaft by the gear 32 33, which engagement is maintained by a spring 43 on the outer end of the shifting shaft constantly pressing it inward.

The accelerating-gear consists of a small friction-wheel 35, Figs. 1 and 9, on a short shaft 36, mounted parallel to the line-shaft and arranged to engage the larger friction-wheel near its periphery, while said short shaft 36 engages the line-shaft by the gear 37 38, whereby the friction-wheels when in engagement impart a comparatively fast rotation to the line-shaft, and through it imparts a corresponding speed to the gathering instrument, for a purpose which I will presently state. For the engagement of the friction-wheels the shifting shaft 31 is caused to have an outward movement, and this is effected by the rotation of the crank-lever 25, which is provided with a cam-formed plate 39, Figs. 16, 20, and 21, adapted to engage the upper end of the lever 40, pivoted in the frame and connecting a pivoted arm 41, which engages the end of said shifting shaft 31 and pushes it outward, forcing and holding its friction-wheel 34 in engagement with the accelerating friction-wheels 35, thereby quickly engaging the friction-gearing and increasing the speed of the rotation of the gathering instrument at the proper times in the operation of the machine, as in Figs. 15, 19, and 20. The lever 40 has a roll 42 to receive the action of the lever-cam 39, and the said roll is held in position to receive the action of the cam by the spring 43 upon the shaft 31 and the action of the latter upon the pivoted arm 41. So long, therefore, as the cam-plate 39 of the crank-lever is in engagement with the lever 40 the friction-gear will be held in engagement; but when the said cam-plate in the revolution of the crank passes its contact with said lever 40 then the spring 43 brings the gear 32 33 into engagement and maintains it until the cam-lever again shifts the gear. The cam is so formed with a curved and a flat part as to effect this operation, as in Figs. 16 and 21.

Referring to Figs. 1 and 11, the shaft 26 of the crank cam-lever is preferably arranged about midway between the track-rails, and below this shaft is mounted the clutch-shaft, upon which is loosely fitted two equal pulleys 44 45, with which a clutch 46 is caused to engage as it is shifted by the action of a cam 39 on the lever 40, as I will presently state. These pulleys are continuously driven by belts from pulleys 47 48, Fig. 11, on the power-driven shaft, while a pinion 49 on the clutch-shaft engages a larger gear 50 on the shaft of the crank cam-lever, whereby to cause its rotation. One of the pulleys 48 on the power-driven shaft is comparatively small, the object of which is to give a comparatively slow rotation to the pulley 45 when engaged with the clutch, and which when so engaged causes the carriage to move slowly in advancing the gathering instrument while taking up a charge.

The clutch-shifter 51, Figs. 12, 15, and 17, is controlled by a latch-bar 52, pivotally connected at one end to the lower end of the lever 53, pivoted to the frame and arranged to be engaged by the cam 39 on the crank-lever in a way to vibrate said lever 53 and thereby actuate the clutch-shifter, the said latch-bar having a notch 54, by which it is adapted to engage the upper end of the clutch-shifter.

A spring 55, Figs. 9, 14, and 17, connected to the clutch-shifter 51, constantly tends to engage and maintain the clutch in engagement with the pulley 44, while a spring 101 constantly acts to place the latch-bar-connected lever 53 always in position to receive the action of the cam-lever at each revolution of the latter. The cam-plate 39 acts to pull the latch-bar 52 toward said cam-lever, and the throw of the latch-bar is sufficient to cause the clutch to be engaged with either of the pulleys 44 45 in operating the carriage and in rotating the gathering instrument by the rotation of the crank cam-lever. The form of the cam 39, Figs. 16, 20, and 21, is such that its part which first engages the lever is so curved or formed to vibrate the lever to give it the shifting action, while the flat surface part of the cam acts to hold the clutch to its shifted position until the cam passes off the lever-roll, when the latter will move into position to be again acted upon by the cam in its revolution. In the same way the shifter-shaft is actuated and released. In the construction shown the cam-plate 39 is formed to act upon the gear and the clutch shifting levers at the same time and to release them at the same time; but separate cams may be used to effect these operations. The other end of the crank-lever, which is on the opposite side of the crank-shaft and diametrically in line with the crank, is also provided with a cam 55, Fig. 20, which is arranged and formed to engage the clutch-shifting bar 53 in the revolution of the crank; but this shifting movement is effected by a throw of the cam 55 of less extent than the throw of the cam 39. This lesser throw of the shifting lever acts to shift the clutch only sufficient in extent to throw it out of engagement, as in Figs. 9, 15, and 18, for stopping the carriage at the point of or just after it has reached its full backward movement, which thereby will cause the swing of the gathering instrument to be stopped to deliver the gather either into the press or at the forming-block, according as the machine may be working in the manufacture of pressed or of blown ware. So in like manner this end cam 55 is formed to act upon the lever 40 with a throw only sufficient to put the gear 32 out of engagement with the gear 33, and thereby stop the rotation of the gathering-iron at the time the glass is being dropped into the press. It is therefore at the limit of the backward movement of the carriage-actuating crank that the latch-bar is moved so as to put the clutch out of gear with the drive-pulleys to stop the machine and at the same time stop the rotation of the line-shaft to stop the rotation of the gathering-iron. This action of the end cam in disengaging the gear 32 33 does not give sufficient movement to the shaft 31 to put its friction-wheel 34 in gear. It will be understood that the gear-shifting shaft 31 is continuously driven by the sprocket 28, being fixed to the pulley, which is continuously driven.

It will be seen from the foregoing that the line-shaft is driven at different speeds of rotation, one speed being comparatively slow, given by the gear 31 32 at the time the gathering instrument is being swung out to deliver the gather, and thereby prevent the glass from being thrown off, as would be liable under a rapid rotation. The other and greater speed of the line-shaft is given by the friction-gear at the time the gathering instrument is gathering the glass quickly around the enlarged end of the gathering instrument. This speed is changed to a slower rate as soon as said instrument commences its ascent with the gather to prevent the flying off of the gather.

The gathering instrument is caused to have a lateral swinging movement to carry the gather either to a molding-press 56 or to a forming-block 57 at the side of the machine and for returning to the melting-chamber to repeat the operation of gathering. The outward-swinging movement of the gathering instrument commences as it clears the chamber in the outward movement of the carriage and is effected and controlled by the reciprocation of the carriage and means which I will now describe.

Referring to Figs. 5, 6, and 9, the tubular shaft 7, depending from the turn-table 8, has a horizontal arm 58, (shown in dotted lines in Figs. 9 and 14,) adapted to engage a roll 59, adjustably fixed on the lower carriage-rail and to act in engagement with said roll in such manner as to cause the said shaft 7 to be turned in its bearings, and thereby swing the turn-table and its gathering instrument outward as the carriage moves back. The forward movement of the carriage causes a reverse action of the said arm 58 to swing the gathering instrument inward in position to again enter the chamber. As shown, this arm is of open slotted form, so as to receive the roll 59 as the carriage moves back and to leave the roll as the carriage moves forward. It stands obliquely rearward when the carriage is moving forward, and as its rearward movement brings the arm into engagement with the roll the arm is swung around toward the front, the extent of its swing being governed by the position of the roll, which is set to suit the extent of the movement of the carriage for the work to be done at the press or the block. In its lateral swinging movements the swing end of the carrier for the gathering instrument is supported by a ledge or way 60, fixed to and extending out from the side of the carriage, preferably curved, forming a track on which the carrier swings and being for this purpose provided with roll 61, Figs. 17 and 13, for easy travel. This track has, preferably, a downward incline and a wedge 62 on its lower end placed so that the carrier-roll will ride upon it and drop off with a sudden fall at the limit of the swing movement of the gathering-iron when the glass is to be dropped off into the press. This dropping off the wedge gives the glass a sudden jar and renders its fall from the iron more certain. At this time the carriage and the gathering-iron are without movement, and it will be understood that this dropping off of the glass is only in the operation of the machine in the manufacture of pressed ware and that in such operation the gathering-iron has a swing of considerable extent in working with the press-mold, so that by the time the iron reaches the press the glass will hang from the iron for free separation. The track terminates in a concave 63, into which the carrier-roll drops from the wedge, which is beveled at its free end to allow the carrier-roll to ride up over it in the return swing of the gathering-iron. The pivoted arm 10 carries the gathering instrument in horizontal position normally, as in Fig. 1, and for this purpose the said carrier at its swing end is supported upon a shelf 64, Fig. 7, on which the roll 61 of the carrier rests and which is suspended by a spring 65, secured to the front end of the carrier by a rod 66, adjustably connecting a bracket 67 on the carriage. The adjustment of the tension of this spring gives the proper force for raising the swing end of the carrier for the gathering instrument and for supporting it in horizontal position. The shelf 64 gives the advantage of a level way, as in Fig. 7, to form a junction with the track, so that the roll 61 of the swing-carrier 10 passes easily from the shelf to the track and from the latter to the shelf.

A guide-stem 68, depending from the shelf, passes through a guide 69, fixed to the carriage and connects with a lever device mounted on a depending bracket at the under side of the carriage, whereby the shelf is pulled down to effect the dipping of the gatherer in its gathering function. This lever device consists of two parts, one part 70 of which stands forward and is adapted to engage and pull down the guide-stem 68 and its connected shelf against the tension of the suspending-spring, as in Fig. 4. The other lever part 71 swings down and has a projection or lug 72 on its pivoted end adapted to engage the forward-standing lever part 70 in a way to depress it and its connected shelf.

The guide 69 for the shelf-stem serves to limit the ascent of the shelf in bringing the gathering instrument to a horizontal position, as in Fig. 1. A fixed incline mounted in a hanger depending from the lower rail serves to actuate this lever device. The incline is of approximately inverted-V form, one part 73 standing rearward and the other part 74 standing frontward. The part 73 is arranged to receive and engage the swing end of the lever part 71 as the carriage moves forward to carry the gathering instrument into the chamber as the roll end of said lever part rides up the incline. It is thereby swung back, causing its lug 72 to engage and press down the lever part 70, engaging the shelf-stem, thereby pulling the shelf down, the swing-arm 10 by its weight thereby falling with it and giving a dipping descent to the gathering instrument only sufficient for a skimming action to gather a charge, during which the movement of the carriage is comparatively slow, while the gathering instrument has a rapid rotation. The extent of this dipping is governed by vertically adjusting the incline 73 to give a partial immersion to the gatherer, and I prefer to make this adjustment by a pulley 75, mounted so as to engage a screw-stem 76, which carries the incline, in a way that a cord 77, connecting said pulley and under the control of the attendant, will turn the pulley to raise or to lower the incline, and thereby regulate with exactness the dipping of the gatherer. This provision gives the advantage of setting the gatherer as may become necessary to suit any varying level of the glass; but it is the intention that the glass in the working chamber shall be kept at a uniform level. The highest point of the incline is the limit of the immersion, and the lever device having passed this point the swing-lever part 71 descends the other side of the incline and, dropping off, releases said lever device, the shelf meantime gradually rising during the travel of the lever over its releasing incline and, dropping therefrom, allows the gathering instrument to resume its horizontal position. In dropping off the incline the lever hangs free to ride back out of engagement with the shelf connecting the lever part during the backward movement of the carriage.

It will be understood that the gathering instrument is continuously rotated while advancing to gather a quota of glass to hold it while being moved out of and away from the chamber and while being swung to deliver the gather for work and while delivering the gather.

The utilization of the crank for imparting reciprocating movements to the carriage as the means for carrying provision for automatically controlling the movements of the carriage and for automatically controlling the rotation of the gathering instrument, and particularly as to the speed of such rotation, renders the machine interchangeable for work with press-molds and with forming-blocks, the latter being set in place to receive the blowpipe when the machine is used in the manufacture of blown ware. That part of the crank-arm which has the end cams extends from the crank-shaft in a radial line with the crank, forms an extension of it, and rotates in the same plane, and the cams of both arms act within a revolution of the crank to actuate the shifting-levers in the way stated.

I have shown the machine as organized for operating with a plurality of gathering instruments arranged for identical and simultaneous movements at opposite sides of the machine, and in such construction the turn-tables of the gathering instruments are geared together at their mounting by like gears 78, which cause the turn-tables to swing together, the swing of one produced as described to the same extent swinging the other and the swing of both controlled by the movements of the carriage, as stated. In like manner the rotation of one of the gathering instruments serves to cause and to control the rotation of the other, the rotation of one produced as described rotating the other with the same speed. For this purpose the shaft 18, Fig. 5, which causes the rotation of one of the gathering instruments, has a gear 79, engaging by an intermediate gear 81, Fig. 10, an equal gear 80 on a short shaft 82, mounted in a tubular shaft 83 of the turn-table at the other side of the carriage. The shafts 18 and 82 of these two equal gear 79 80 are each connected to and drive the chuck of the separate gathering instruments by means of a flexible shaft 17, each connecting by intermediate gear 15, Fig. 3, with the chuck-shafts. The intermediate gear 81, which engages the equal gear 79 80 of the chuck-operating shafts, causes the gathering instruments to rotate in opposite directions, as in Fig. 10.

In the forward movements of the carriage the gathering instruments, as shown, are caused to swing in parallel relation and in such relation move into and out of the melting-chamber in gathering each a charge of glass; but after leaving the chamber and during the continued outward movement of the carriage the gathering instruments are caused to swing out from the carriage to deliver the gather to their respective working parts.

It will be understood that in working the machine in the manufacture of pressed ware the gathering instrument is a solid iron 84, which remains in the machine while gathering and dropping such gather into the molding-press, as in Fig. 9.

When the machine is used for the manufacture of blown ware, a blowpipe 85 is substituted for the solid iron for operation with a forming-block, as in Figs. 13 and 14, and a separate blowpipe is used for each gather. For such work the chuck has an air-tight fitting for the blowpipe and a suitable blow communication therewith, whereby the glass is blown while being mechanically rotated and formed upon the block. In changing the blowpipes provision is made for supporting a blowpipe on the machine in readiness to take the place of the one removed and to automatically deliver the pipe into the chuck as soon as the one having the blown gather is removed. In this use of the machine the swing of the pipe is only sufficient to place the glass on the block near the side of the machine, and while in this position the pipe is rapidly rotated in the machine, and while the glass is being puffed or blown the pipe is carried in the machine, as in Figs. 13 and 14.

In Fig. 1 I have shown in dotted lines means whereby a blowpipe is supported to be dropped and automatically inserted in the chuck, and in Figs. 15 and 16 I have shown how this is done. On the upper track-beam, near its front end, is secured a horizontal bracket 86, standing at the side and having at its end a tilting device 87 hinged so as to tilt downward and toward the chuck and formed so as to hold the gathering end of the pipe and act as a grooved runway for it. At the required distance from this tilting device is mounted upon the track-beam a hanger device 88, Fig. 1, adapted to hold the blow end of the pipe. This hanger device is pivoted in a vertical position, its lower end formed with rest-lip for the pipe, its upper end serving as a handle, being held against a stop 89 by a spring 90, which constantly pulls it against said stop to keep the rest-lip always in position to hold the pipe. The tilting device is somewhat like a scoop or runway, Fig. 14, and is provided with a counterweight 91, serving to more than balance the pipe resting within said device. A stop acting against the bracket limits the tilting of this device to an angle of about sixty degrees, as in Fig 13. The hinge of this tilting device is about vertically in line with the center of the forming-block, the object being to deliver the pipe into the chuck at the time the finished blowpipe is removed and while the carriage is standing at the limit of its rearward movement and while the blowpipe is still rotating. The delivery and placing of the pipe in the chuck, Fig. 3, are effected as follows: The rest-lip is tripped, letting the end of the pipe drop into a guide-rest 93, the gathering end of said pipe still resting in the tilting device 87. The blow end of the pipe falling first will cause it to tilt the weighted device, so that the gathering end of the pipe will slide down upon it, while the blow end of the pipe, having fallen into a concave guide-rest 93, secured upon the swing-arm 10 in front of the chuck, serves to support and guide the end of the pipe as it is driven into the chuck by the action of its gathering end as it slides down the inclined grooved face of the tilting device, the inclined position of which acts to shove or slide the pipe as it falls fully in place in the chuck, where it is held from turning by the screws, the same as the solid iron. The pipe is thus almost instantly dropped and automatically chucked, so that the carriage is started for another gathering almost at the very time the blowpipe is removed from the chuck, because at the time of removing a pipe another is placed on the machine just where it can fall and be pushed into the place of the one removed. In this change the attendant uses one hand to remove the finished blowpipe and his other hand to place another pipe on its hanger and tilting device to be dropped and chucked. In this operation the blowpipe continues to rotate. The pipe having been delivered and chucked, the tilting device is caused to resume its normal position, Fig. 1, to receive another pipe.

Referring to Fig. 5, the chuck-shaft 12 is seen hollow and is fitted with a rubber packing-tube 94, into which the blowpipe is driven or pushed to provide an air-tight joint. At the geared end the chuck-shaft has a "puff-tube" 95, which opens into the packing-tube and which at its outer end has an orifice 96, which by a suitable mouthpiece, which, as shown, is like the mouthpiece of a speaking-tube, projecting through an opening in the cheek 9 of the turn-table, Figs. 1, 3, and 6, enables the attendant to blow or puff the glass while being formed upon the block. The mouthpiece connecting tube 95 is fitted freely within the chuck-shaft, and thereby forms a non-rotating connection with the rotating blowpipe, it being understood that the glass is "puffed" or blown only when the pipe places it on the block. In Fig. 6 this mouthpiece is seen as a projection on the side of the cheek 9 of the turn-table and is dotted through said cheek and crosses to its connection with the orifice 96 in the puff-tube, (seen in Fig. 3,) so that the mouthpiece in the cheek 9 and the orifice in the puff-tube are connected by the short flexible tube. A spring 98, Fig. 3, acting on the outer end of the puff-tube, serves to keep it under tight fit in the chuck-shaft to prevent escape of air.

A round table 57 is provided with a number of forming-blocks 99 of different sizes and which contain water into which the glass is rolled in the operation of puffing. The round table can be adjusted vertically to suit the placing of the gather into the block and the table can be turned to bring different blocks into use. The swing of the pipe to the block is about eighteen inches, which is controlled by setting the roll 59 so as to engage the turn-table arm 58 at the proper time and point in the outward movement of the carriage. The farther away the roll is set, the greater will be the extent of the outward swing of the turn-table and of course the gathering instrument. The track or way on which the swing is made is of course suited for such movement of the blowpipe, so that it will be delivered without undue jar or fall at the block.

For accelerating the rotation of the pipe at the block, the end cam 55 of the crank-lever is supplemented by a cam-plate 100, Figs. 15 and 16, the function of which is to act upon the lever 40, and through it the shifting shaft 31, to engage the friction-gear with the line-shaft. This increased speed is advantageous in blocking the glass and facilitates its finish on the block, and the cam-plate 100 is added only when the blowpipe is in use. This added cam has the same form as the cam 55 and is merely fitted upon its face, as in Figs. 15 and 16, to engage the friction-gear to give increased speed to the blowpipe when operating at the forming-block under the accelerated speed of the friction-gear.

In the multiple arrangement of the gathering instruments they are mounted alike on opposite sides of the carriage and the provisions for using one are identical with those for using the other whether the operation be for the manufacture of pressed or for blown ware, and of course this requires an attendant for the work at each side of the machine.

In the operation of the machine it will be understood that the band from the power-driven pulley 47 constantly drives the loose clutch-pulley 44 on the clutch-shaft, and by means of the sprocket-chain 29 said pulley drives the shifting pulley-shaft 31, because said pulley 44 has fixed thereto the sprocket-wheel of said chain; that the loose clutch-pulley 45, also on the clutch-shaft, has a slower rotation than the pulley 44, because it is driven by the comparatively small power-driven pulley 48, and that the crank-shaft is driven from the clutch-shaft, as in Fig. 11, and that therefore the engagement of the clutch with the loose pulley 44 will give a comparatively rapid movement to the crank-shaft, and hence to the carriage. From this it will be seen that the shifting of the clutch will give a slow or a rapid rotation to the crank to reciprocate the carriage both fast and slow for purposes suited to different stages of the work and that these different speeds are automatically effected and controlled by cams carried by the crank-shaft and adapted to actuate a clutch-bar, by which the clutch is shifted from engagement with the pulley 44 and engaged with the other pulley 45. For this purpose the latch-bar through the lever 53 is positively moved by the cam 39, Fig. 12, while a spring 101, Fig. 12, acts to return said lever to its position to be again engaged by said cam; but in this movement of the latch-bar it is first disengaged from the clutch-shifter 51 by being lifted by the attendant, when the connected shifter-spring 55' will shift the clutch from the pulley 45 to the pulley 44. As the latch-bar rests freely upon the clutch-shifter 51, as in Fig. 12, and slides upon it in returning the lever 53 to its normal position, the notch of the latch-bar will again by its weight engage the clutch-shifter in readiness to again shift the clutch by the action of the cam in the rotation of the crank.

That the movements and speed of the carriage and the rotation and speed of the gathering-blowpipe may be more clearly understood as produced by the revolution of the crank-shaft cams the following is the order step by step of such movements of the machine operating with the blowpipe for gathering glass for blown ware.

Referring to Figs. 1 and 9, the carriage will be understood as moving forward under the fast speed of the drive-pulley 44, with the crank 25 descending to engage its cam 39 with the shifting-levers. The gathering-blowpipe on entering the chamber is caused to dip, thereby partially immersing its gathering end into the glass and at the time the said cam 39 is brought into engagement with the lever 53 causing it to shift the clutch from the drive-pulley 44 to the drive-pulley 45, and thereby slow the movement of the carriage while the end of the pipe is skimming the glass. At the same time the cam 39 has engaged the lever 40, causing it to shift the shaft 31 to engage the friction-gear 34 35, and thereby accelerate the rotation of the line-shaft 24 to rapidly rotate the blowpipe while it is gathering the glass. In the top view, Fig. 19, this cam is seen as descending and engaging the two levers at the same time and the cam leaves the levers at the same time, and while engaged with them the said cam holds the shifted parts in their positions long enough to effect the purpose of shifting the clutch and the gear. The cam 39 therefore gives a slow forward movement and a rapid rotation to the blowpipe while it is in the glass; but as soon as this cam passes its engagement with the shifting-levers and the crank passes its dead-center the clutch is again quickly engaged with the fast pulley 44, as in Fig. 17, and the shaft 31 is again engaged with the line-shaft, causing the blowpipe to rotate slowly, this while it is rising and swinging out to the forming-block; otherwise the glass would tend to be thrown off by centrifugal force. In the meantime the releasing of the clutch-lever 53 causes the clutch to again engage the pulley 44 to give a rapid outward movement to the carriage to swing out and bring the blowpipe as quickly as possible to the forming-block, this speed being necessary to carry the glass to the forming-block with the least loss of time. At the time or just before the crank reaches its other dead-center in its rotation and about as the blowpipe reaches the forming-block the end cams 55 and 100 are brought into engagement with the shifting-levers, as in Fig. 15, to stop the movement of the carriage and again rapidly rotate the pipe. In this engagement the cam 55 is caused to shift the lever 53 only to an extent that will place the clutch out of engagement with the drive-pulley 44, and thereby stop the movement of the carriage. At the same time the cam 100 engages the lever 40, and thereby shifts the shaft 31 and engages the friction-gear to rapidly rotate the blowpipe in blocking the glass at the forming-block. In this action of the end cams they engage the shifting-levers at the same time and leave them at the same time, and while so engaged hold the shifted parts in their positions long enough to effect the purpose of shifting the clutch and the gear. While the blowpipe is being rotated at the block, the attendant places his mouth at the blow-tube 97 and puffs the glass while it is being rotated. The placing of the blow-tube in the turn-table not only renders it convenient for puffing while being rotated in the machine, but by making the tube which forms the blow-orifice flexible its connection with the blowpipe through the cheek of the turn-table allows the blowpipe to swing vertically on its pivotal connection with the cheek. The glass having been sufficiently puffed the blowpipe is removed and another pipe put in its place. The attendant then raises the latch-bar 52, releasing the clutch-shifter 51, which by its spring 55' again engages the clutch with the pulley 44, and the carriage is quickly driven forward, returning the blowpipe in position again to enter the chamber to repeat the operation. In releasing the clutch to make this shift the latch-bar by its notch is again automatically engaged with the said clutch-shifter 51 by means of the spring 101 to again shift the clutch.

From the foregoing it will be seen that the blowpipe has three separate and distinct degrees of speed in its rotation—a rapid speed while gathering the glass, a slow speed while swinging out to the block, and, again, its rapid speed while the glass is being puffed or blocked.

Referring to the provision for automatically chucking the blowpipe by dropping it from hangers, one of which forms a tilting incline or way which acts to push the pipe endwise into the chuck on being dropped in front of the latter, it is important to note that the heaviest or gathering end of the pipe occupies a position near the hinge of the tilting incline, so that the weight of the pipe will not act to tilt the incline until the blow end of the pipe has been released and has fallen into and rests in the guide which receives it. This provision for automatically delivering a suspended blowpipe from its suspending-hangers on the frame of the machine into the chuck while it is without movement saves the expense of an attendant to handle and secure the pipe in the machine. In the delivery fall of the pipe the jar it receives by its liberated end striking upon the guide-rest will start the tilting of the hanger, and thereby the forward movement of the pipe upon the tilting hanger, and slide it into the chuck as the pipe slides down with and upon the hanger.

It will be understood that many of the devices described are not essential to the several features of my invention, separately considered. This will be indicated in the concluding claims, as in any given claim the omission of an element or the omission of reference to the particular features of elements mentioned is intended to be a formal declaration of the fact that the omitted elements or features are not essential to the invention therein covered. As a matter of fact, however, while I have shown and described the machine in its relation to the blowpipe and its holder, yet it is apparent that the machine is complete in its organization without the presence of the blowpipe in its holder.

I have illustrated in the accompanying drawings the invention claimed herein in a machine wherein a solid gathering-iron and a gathering-blowpipe may be separately used for the separate operations which I have described, and as to all and every matter of the devices and combinations of devices embraced in such machine other than those which belong to and are in combinative relation as to all matters embodied in said claims and which appertain to and are particularly directed to and employed with a gathering-iron in the operation of the machine for the manufacture of pressed ware they are embodied in a separate application for a patent filed by me of even date herewith for such machine in its adaptation and use for the operations of gathering and delivering glass with a solid gathering-iron, and therefore are not claimed herein.

I claim—

1. In apparatus for gathering and delivering glass in the manufacture of blown ware, and in combination with a reciprocating carriage, a turn-table mounted thereon and a swing-carrier pivotally mounted on said turn-table and projecting over the latter, of a chuck applied to said pivoted carrier provided with an air-passage, a blowpipe connecting said chuck at the pivoted end of the carrier above the turn-table and a flexible puffing or blow tube connecting the blowpipe-passage with a blow-orifice in one side of said carrier whereby the said blowpipe is operated by blowing through the turn-table orifice.

2. For gathering and delivering glass in the manufacture of glassware, a gathering-blowpipe and a carriage therefor, and mechanism automatically operating said blowpipe to gather the glass in a chamber by a rapid rotation, to reduce the speed of said rotation while being swung out to deliver the gather to the block, and to again increase the speed while puffing or blocking the glass at the block.

3. In apparatus for the manufacture of blown glassware, the combination with a reciprocating carriage, a turn-table applied to the carriage and having a cheek formed with a mouth puffing-opening, and a swing-carrier pivotally connected with the cheek and adapted to move vertically at its free end, of a chuck-shaft applied to the pivoted carrier and having a passage in communication with the puffing-opening in said cheek and a blowpipe having communication with the cheek puffing-opening.

4. In apparatus for the manufacture of blown glassware, the combination with a reciprocating carriage, a swing-carrier applied to the carriage, and a blowpipe, and a train of connections for the driving mechanism and the blowpipe for rotating the latter of a changeable-speed gearing forming a part of the aforesaid train of connections, and means for changing the relation of the speed-gearing for accelerating the rotation of the blowpipe over the forming-block, substantially as and for the purpose specified.

5. In a machine for the manufacture of blown glassware, the combination with a reciprocating carriage, mechanism for imparting a reciprocating movement thereto, a support provided with a blowpipe, and means for imparting a vertical movement and a lateral swing to the said support, of a train of connections between the blowpipe and the afore-described actuating mechanism including a speed-gearing, a clutch device for throwing the carriage into and out of gear, and means for accelerating the rotation of the blowpipe and throwing the carriage out of action when the receiving end of the blowpipe brings the quota of glass in position to be operated upon by the forming-block, substantially as described.

6. In apparatus for the manufacture of blown glassware, the combination with the reciprocating carriage, a swing-carrier applied to the carriage and provided with a blowpipe, a power-driven shaft, a crank applied to the power-driven shaft and having connection with the carriage for reciprocating it, and a fast and a slow driven pulley, of a train of connections between one of said pulleys and the blowpipe including a changeable-speed gearing, of a clutch, a shifting-lever, and cams applied to the said crank-shaft to simultaneously throw the carriage out of action and the highest-speed gearing into engagement, whereby the rotation of the blowpipe is accelerated in working the glass over the forming-block.

7. In a machine for the manufacture of glassware, the combination with a reciprocating carriage provided with a chuck, of means for supplying a blowpipe to the chuck consisting of pivoted hangers between and to which the blowpipe to be placed in position is suspended, one of said hangers being adapted to be tripped to release one end of the blowpipe which falls into position to be taken in by the chuck, and the other hanger tilting and forming a resistance to force the blowpipe home into the chuck, substantially as set forth.

8. In a machine for the manufacture of glassware, the combination with a reciprocating carriage provided with a chuck, of means for supporting a blowpipe consisting of a pivoted hanger weighted at one end to automatically assume a normal position when released after being tilted and a second pivoted hanger, the said weighted hanger adapted to be tripped and to form an inclined way for chucking the pipe as it falls from said hangers.

9. In apparatus for the manufacture of glassware, the combination with the reciprocating carriage provided with a chuck, of means for holding the blowpipe in position to be quickly supplied to said chuck consisting of a pivoted hanger adapted to be tripped to release one end of the blowpipe, and a second pivoted hanger weighted and adapted to form a guideway for the gathering end of the pipe in the operation of chucking it.

10. In a machine for the manufacture of glassware, the combination with a reciprocating carriage provided with a chuck, of means for holding a blowpipe in proper position to be chucked consisting of a pivoted hanger adapted to be tripped and constructed to engage one end of the pipe, and a second pivoted hanger weighted at one end and having its opposite end formed to receive the other end of the blowpipe, and a stop applied to the last-mentioned pivoted hanger to limit the tilting thereof, whereby to form a resisting way for automatically chucking the pipe.

11. In a machine for gathering and delivering glass in the manufacture of blown ware the combination of a frame and a reciprocating carriage having a chuck, means for supporting a blowpipe on said frame and means automatically to deliver said pipe into the chuck by a sliding pushing action on one end to chuck the pipe as it is delivered from its supports.

12. In a machine for gathering and delivering glass in the manufacture of glassware, the combination of a frame having a chuck, means for suspending a blowpipe on said frame above the chuck and means automatically to deliver the pipe into the chuck by the gravity of the pipe and resistance applied to its gathering end when released from suspension and falling.

13. In a machine for gathering and delivering glass in the manufacture of blown ware, the combination with a frame and a reciprocating carriage provided with a chuck, of means for holding a blowpipe in suspension on said frame consisting of a tripping-hanger for the blow end of the pipe and a pivoted hanger for the other end of the pipe adapted to form an incline resisting-way acting on the end of the pipe, and a guide-rest fixed in front of the chuck whereby the blow end of the pipe is supported and guided into the chuck under the action of said resisting-incline.

14. In a machine for gathering and delivering glass in the manufacture of blown ware, the combination of a frame and a reciprocating carriage having a rotating chuck, means for suspending a blowpipe above the chuck constructed and arranged to operate to release the blow end of the pipe and to maintain the other end of the pipe on its suspending means while automatically chucking the pipe.

15. In a machine for gathering and delivering glass in the manufacture of blown ware, the combination of a frame and a reciprocating carriage having a chuck, a depending trip-hanger mounted on the frame, and a resisting-incline pivotally mounted on said frame and arranged to tilt downward toward the trip-hanger, means automatically to cause said pivoted incline to maintain a normal horizontal position, and means automatically to hold said trip-hanger in its normal vertical position whereby the said trip-hanger and the said pivoted incline constitute means for suspending a blowpipe in position to be automatically delivered into the chuck.

16. In a machine for gathering and delivering glass in the manufacture of blown ware, the combination of a reciprocating carriage and a swing-carrier pivotally mounted upon said carriage and having a tubular chuck-shaft for holding a blowpipe in one end and means for rotating said shaft, a puff-tube within one end of said chuck-shaft, having a non-rotating relation thereto and a blow-mouthpiece in the side of said swing-carrier connecting the puff-tube, whereby the said chuck-shaft is caused to rotate over the fixed interior puff-tube.

17. In a machine for gathering and delivering glass in the manufacture of blown ware, the combination of a reciprocating carriage and a swing-carrier pivotally mounted upon said carriage and having a tubular chuck-shaft for holding a blowpipe in one end, and means for rotating said shaft, a puff-tube within one end of said chuck-shaft, having a non-rotative relation thereto, a mouthpiece in the side of said swing-carrier connecting said puff-tube, and a spring whereby said blow-tube is maintained in air-tight relation to said chuck-shaft, and its blowpipe.

18. In a machine for gathering glass in the manufacture of blown ware, and in combination with a blowpipe-holder, means to cause said holder to be moved toward and from the glass, means for rotating said holder, and means automatically operating to vary the speed of such rotation at the position of the blowpipe while gathering and while being blown.

In testimony whereof I have hereunto signed this specification in the presence of witnesses.

WILLIAM FRANCIS ALTENBAUGH.

Witnesses:
J. H. HERSHBERGER,
J. B. EHRENFRIED.